(12) United States Patent
Johnson et al.

(10) Patent No.: US 11,174,992 B2
(45) Date of Patent: *Nov. 16, 2021

(54) SYSTEM AND METHOD FOR REFUELING A VEHICLE TANK WITH LIQUEFIED PETROLEUM (LP) GAS

(71) Applicant: Blossman Services, Inc., Ocean Springs, MS (US)

(72) Inventors: Jessie W. Johnson, Asheville, NC (US); David Alexander Kennedy, Asheville, NC (US)

(73) Assignee: Blossman Services, Inc., Ocean Springs, MS (US)

( * ) Notice: Subject to any disclaimer, the term of this patent is extended or adjusted under 35 U.S.C. 154(b) by 71 days.

This patent is subject to a terminal disclaimer.

(21) Appl. No.: 16/710,874

(22) Filed: Dec. 11, 2019

(65) Prior Publication Data

US 2020/0116306 A1     Apr. 16, 2020

Related U.S. Application Data

(63) Continuation of application No. 15/440,698, filed on Feb. 23, 2017, now Pat. No. 10,520,136.

(51) Int. Cl.
| | |
|---|---|
| *F17C 5/02* | (2006.01) |
| *F17C 13/02* | (2006.01) |
| *B60K 15/04* | (2006.01) |
| *B60K 28/10* | (2006.01) |
| *F17C 6/00* | (2006.01) |

(Continued)

(52) U.S. Cl.
CPC .......... *F17C 5/02* (2013.01); *B60K 15/03006* (2013.01); *B60K 15/04* (2013.01); *B60K 28/10* (2013.01); *F17C 5/007* (2013.01); *F17C 6/00* (2013.01); *F17C 13/02* (2013.01); *B60K 2015/03013* (2013.01); *B60K 2015/03019* (2013.01); *B60K 2015/0323* (2013.01); *B60K 2015/03243* (2013.01); *B60K 2015/03309* (2013.01); *B60K 2015/049* (2013.01); *F17C 2201/0104* (2013.01); *F17C 2201/035* (2013.01); *F17C 2201/056* (2013.01);

(Continued)

(58) Field of Classification Search
CPC ...... B60K 2015/0323; B60K 15/03243; B60K 15/03019; B60K 2015/049; F17C 5/007; F17C 6/007; F17C 13/02; F17C 5/02
See application file for complete search history.

(56) References Cited

U.S. PATENT DOCUMENTS

| | | | | |
|---|---|---|---|---|
| 4,503,885 A | ‡ | 3/1985 | Hall ..................... | B60K 15/077 |
| | | | | 123/514 |
| 5,050,567 A | ‡ | 9/1991 | Suzuki ................ | F02M 37/106 |
| | | | | 123/497 |

(Continued)

*Primary Examiner* — Timothy L Maust
(74) *Attorney, Agent, or Firm* — Sterne, Kessler, Goldstein & Fox P.L.L.C.

(57) ABSTRACT

A vehicle has a fuel system that includes a controller that determines when the vehicle is in a refuel mode or a run mode based on a connection of a refuel nozzle to a vehicle connection of the vehicle. The controller controls a fuel pump input selector, a vehicle fuel pump, and a fill/run fuel selector such that fuel is pumped from a storage tank external to the vehicle into a vehicle fuel tank by way of the vehicle fuel pump in the refuel mode, and fuel is pumped to an engine of the vehicle from the vehicle fuel tank by way of the vehicle fuel pump in the run mode.

20 Claims, 8 Drawing Sheets

(51) Int. Cl.
  *F17C 5/00* (2006.01)
  *B60K 15/03* (2006.01)

(52) U.S. Cl.
  CPC ............. *F17C 2205/0326* (2013.01); *F17C 2205/0364* (2013.01); *F17C 2205/0376* (2013.01); *F17C 2221/035* (2013.01); *F17C 2223/0153* (2013.01); *F17C 2223/033* (2013.01); *F17C 2223/046* (2013.01); *F17C 2223/047* (2013.01); *F17C 2225/0123* (2013.01); *F17C 2225/0153* (2013.01); *F17C 2225/033* (2013.01); *F17C 2225/035* (2013.01); *F17C 2225/047* (2013.01); *F17C 2227/0135* (2013.01); *F17C 2227/0178* (2013.01); *F17C 2227/0185* (2013.01); *F17C 2250/032* (2013.01); *F17C 2250/034* (2013.01); *F17C 2250/043* (2013.01); *F17C 2250/0413* (2013.01); *F17C 2250/0443* (2013.01); *F17C 2250/0478* (2013.01); *F17C 2250/0491* (2013.01); *F17C 2250/0636* (2013.01); *F17C 2250/075* (2013.01); *F17C 2260/022* (2013.01); *F17C 2260/025* (2013.01); *F17C 2265/065* (2013.01); *F17C 2265/066* (2013.01); *F17C 2270/0139* (2013.01); *F17C 2270/0168* (2013.01); *F17C 2270/0178* (2013.01)

(56) References Cited

U.S. PATENT DOCUMENTS

| | | | | |
|---|---|---|---|---|
| 5,329,164 | A ‡ | 7/1994 | Saito | B60K 15/03519 123/198 DC |
| 5,720,327 | A ‡ | 2/1998 | Foster, Jr. | B60K 15/00 123/198 DC |
| 5,787,865 | A ‡ | 8/1998 | Harris | B01D 35/0273 123/516 |
| 6,012,904 | A * | 1/2000 | Tuckey | F02M 37/025 417/203 |
| 7,117,856 | B2 ‡ | 10/2006 | Honda | B60K 15/077 123/514 |
| 8,171,916 | B2 ‡ | 5/2012 | Nishibu | F02M 37/0023 123/458 |
| 8,276,568 | B2 * | 10/2012 | Takagi | F02D 41/0025 123/511 |
| 8,302,582 | B2 ‡ | 11/2012 | Oohashi | F02M 37/0029 123/446 |
| 9,938,951 | B1 ‡ | 4/2018 | Ghannam | B60K 15/04 |
| 10,520,136 | B2 * | 12/2019 | Johnson | F17C 5/007 |
| 2010/0139778 | A1 ‡ | 6/2010 | Kato | F02D 33/003 137/14 |
| 2011/0209789 | A1 ‡ | 9/2011 | Murabayashi | B60K 15/03 137/899 |

\* cited by examiner
‡ imported from a related application

SYSTEM AND METHOD FOR REFUELING A VEHICLE TANK WITH LIQUEFIED PETROLEUM (LP) GAS

This application is a continuation of U.S. application Ser. No. 15/440,698, filed Feb. 23, 2017 and now, the disclosure of which is incorporated by reference in its entirety.

BACKGROUND

Field

The disclosure relates to a system and method for refueling a vehicle tank with liquefied petroleum (LP) gas from a storage tank using a fuel pump onboard the vehicle.

Background

LP gas is a by-product of natural gas processing and includes such fuels as propane and butane, and may also include amounts of propylene and butylene in various mixtures. As used herein, the terms "liquefied petroleum gas," "LP gas," and "LPG" are used interchangeably and are intended to refer to propane, butane, iso-butane, propylene, butylene, and methane, alone or in various mixtures, as well as to mixtures of other hydrocarbon gases that are stored in liquid form, under pressure, and are used as fuel for internal combustion engines.

LP gas is highly flammable and is therefore commonly used for fueling cooking and heating appliances. LP gas is also increasingly being used to power personal and commercial vehicles due to the relatively lower cost and environmental impact, as compared to conventional liquefied fuels such as gasoline or diesel.

Figure 1A:
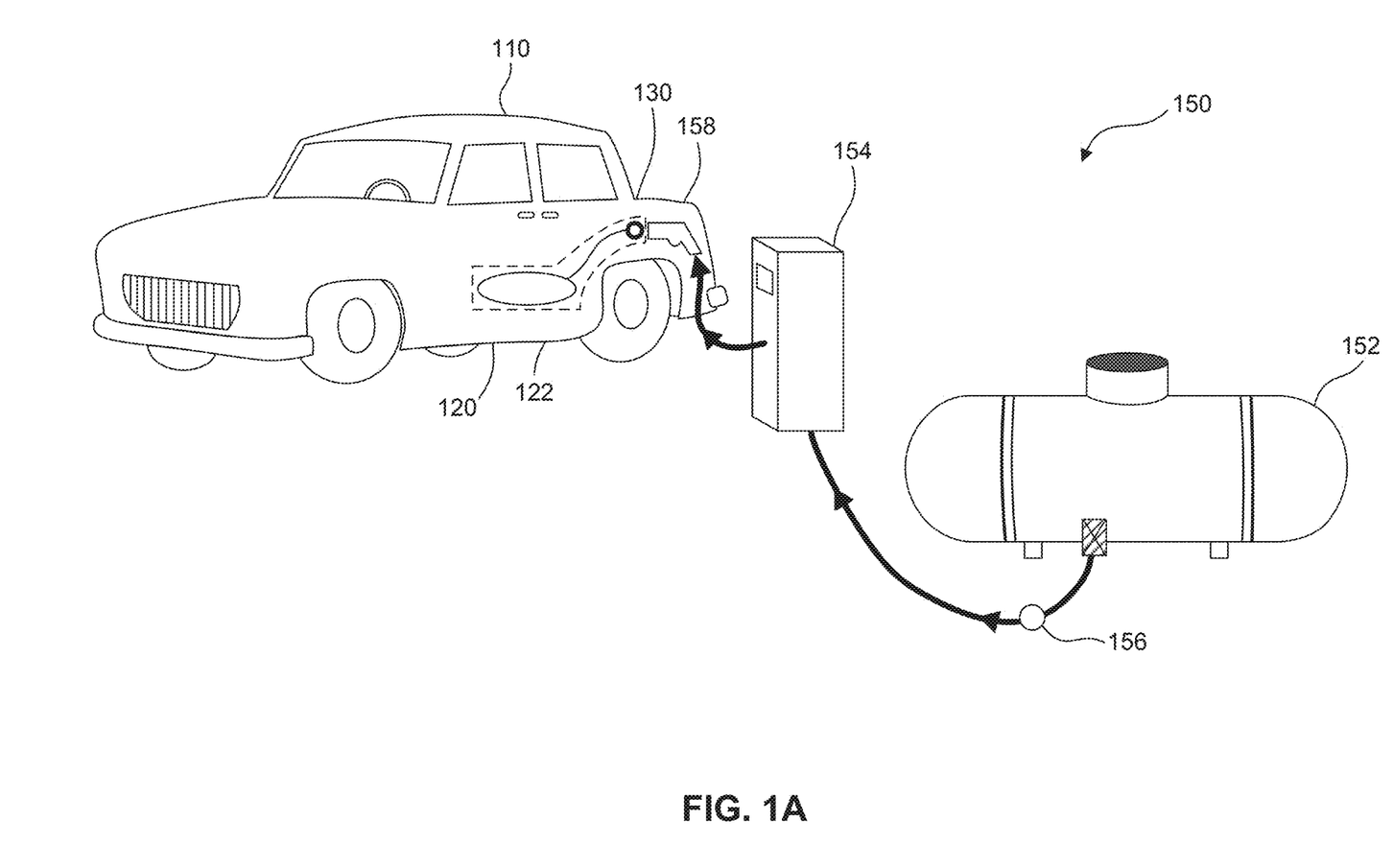
FIG. 1A illustrates a conventional vehicle and refueling station.
Figure 1B:
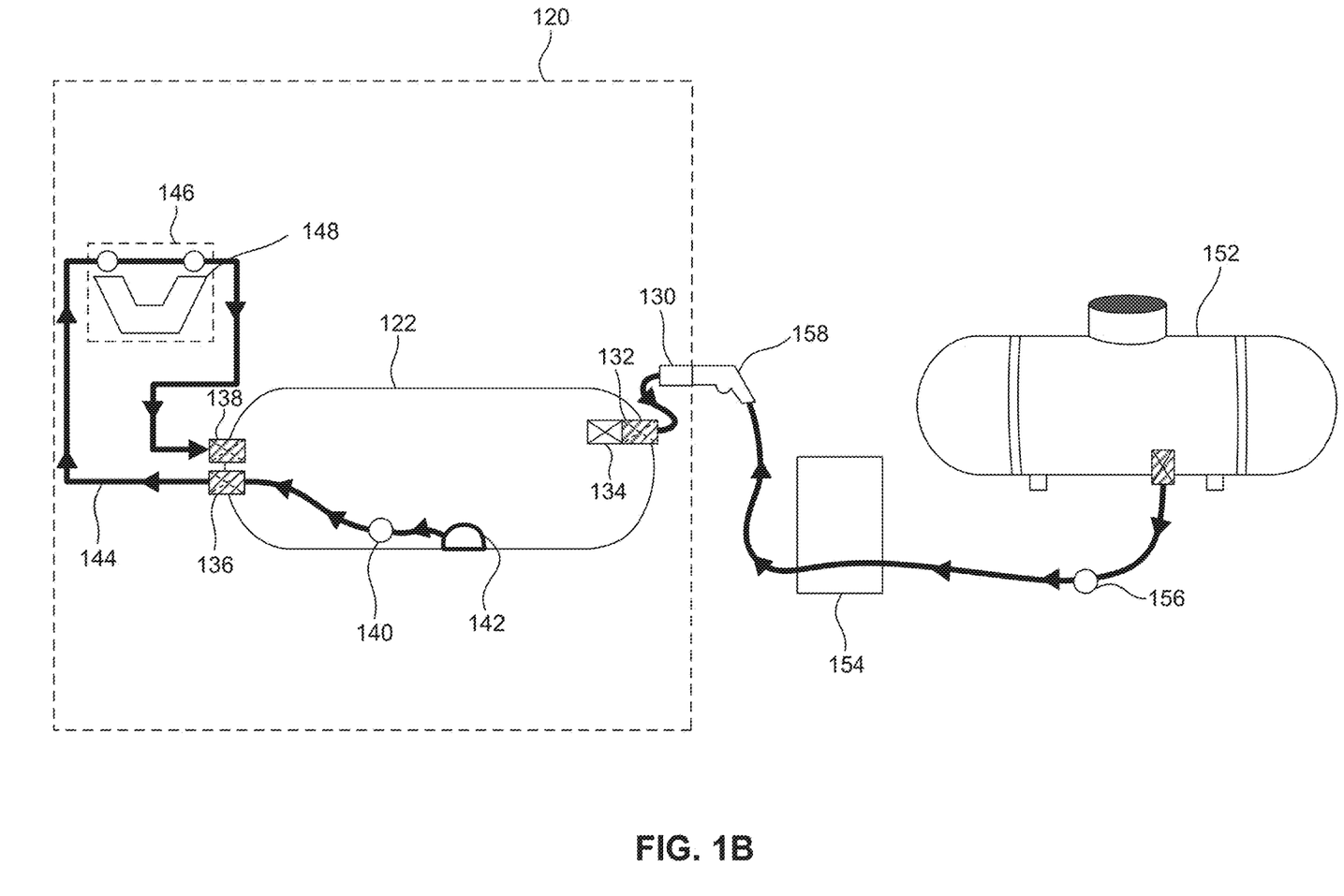
FIG. 1B is a schematic diagram illustrating the conventional vehicle and refueling station of FIG. 1B.

Typically, a vehicle having an LP gas fuel system is refueled and operated similarly to other liquid fueled vehicles, such as those running on gasoline or diesel. During the refueling operation, a pump is required to move LP gas from a storage tank to a vehicle fuel tank. Unlike gasoline and diesel refueling operations, however, with LP gas, both the vehicle fuel tank and the storage tank are pressurized. A typical LP gas refueling operation is illustrated by FIGS. 1A-1B, which depict a vehicle 110 and a conventional refueling station 150. As shown by FIGS. 1A-1B, vehicle 110 includes a fuel system 120 having a connector 130 for receiving fuel from conventional refueling station 150 and a vehicle fuel tank 122 to store propane for vehicle 110. Conventional refueling station 150 includes a fuel storage tank 152 for storing LP gas, a refueling pump 156 for removing propane from storage tank 152, a pump station 154 for controlling refueling pump 156 and monitoring the flow of fuel dispensed from refueling pump 156, and a nozzle 158 for dispensing fuel into vehicle fuel tank 122 of vehicle 110.

To refuel, a user turns off an engine of vehicle 110 and connects nozzle 158 to fuel connector 130 of vehicle 110. The user then presses and holds a lever on nozzle 158, and/or activates a switch, a lever, or a button on pump station 154, to activate refueling pump 156. Once activated, refueling pump 156 pulls propane from storage tank 152 and pushes the propane to vehicle 110 via nozzle 158. Propane enters vehicle 110 by way of fuel connector 130 and then flows into fuel tank 122 via tank fill inlet 132 on fuel tank 122.

There are a number of ways that the pump station 154 terminates a refueling operation. For example, a user can stop refueling at any point be releasing the lever on nozzle 158, or pump station 154 can limit an amount of fuel based on the amount that was purchased. The pump station 154 can also stop refueling upon activation of an overfill protection device (OPD) 134 within vehicle 110. OPD 134 prevents overfilling of fuel tank 122. Typically, OPD 134 includes a float located near tank fill inlet 132 (as illustrated by FIG. 1B), or near fuel connector 130 in other examples, which rises as fuel fills fuel tank 122 and a plug that plugs tank fill inlet 132 when the float has raised to a predetermined fuel level, typically 80% of the tank level. Pump station 154 monitors the flow of fuel being dispensed to vehicle 110 such that when the flow of fuel stops (i.e., the rate of flow of the fuel is substantially zero gallons per minutes (gpm)) due to the tank fill inlet 132 being plugged by OPD 134, pump station 154 turns off refueling pump 156. After refueling has finished, the user can then disconnect nozzle 158 from fuel connector 130.

A general operation of providing fuel to an engine of vehicle 110 will now be discussed. Vehicle 110 includes a fuel pump 140 configured to pump LP gas from fuel tank 122 to an engine 146 of vehicle 110, shown in FIG. 1B. In a run operation, fuel pump 140 removes LP gas from fuel tank 122 via fuel pickup 142 which may include a fuel hose and/or a fuel filter to pickup propane from fuel tank 122. Fuel pump 140 pushes the propane to an engine fuel line 144 by way of a tank outlet 136. LP gas flows through engine fuel line 144 to engine 146 where some of the propane is injected into fuel rails 148. Unused fuel is returned to fuel tank 122 via engine fuel line 144 and a return inlet 138 of the vehicle fuel tank 122.

Ideally, fuel stations would provide LP gas to vehicles in a quick and convenient manner. However, LP gas fueling stations have limitations which discourage or hamper the more widespread adoption of LP gas use in vehicles. For example, despite the increase in popularity of LP gas vehicles and unlike conventional gas and diesel fueling stations, there are relatively few LP gas fueling stations in the United States. This means that owners of LP gas fueled vehicles are forced to either (a) drive extra distances for refueling or (b) purchase refueling pumps for installation at the customer's home or business. Customers that have a large fleet of vehicles are typically able to justify the expense of an LP gas fueling station. However, individuals with personal vehicles and companies with smaller numbers of fleet vehicles are less likely to convert to an LP gas fuel system due to the high costs of an LP gas fueling station.

What is needed is a fueling system for a vehicle that provides a method of refueling the vehicle in a safe and cost efficient manner.

BRIEF DESCRIPTION OF THE DRAWINGS

The accompanying drawings, which are incorporated herein and form a part of the specification, illustrate embodiments of the present disclosure and, together with the description, further serve to explain the principles of the disclosure and to enable a person skilled in the pertinent art to make and use the embodiments.

The present disclosure will be described with reference to the accompanying drawings. In the drawings, like reference numbers indicate identical or functionally similar elements. Additionally, the left most digit(s) of a reference number identifies the drawing in which the reference number first appears.

DETAILED DESCRIPTION

The following Detailed Description refers to accompanying drawings to illustrate exemplary embodiments consistent with the disclosure. References in the Detailed Description to "one exemplary embodiment," "an exemplary embodiment," "an example exemplary embodiment," etc., indicate that the exemplary embodiment described may include a particular feature, structure, or characteristic, but every exemplary embodiment may not necessarily include the particular feature, structure, or characteristic. Moreover, such phrases are not necessarily referring to the same exemplary embodiment. Further, when a particular feature, structure, or characteristic is described in connection with an exemplary embodiment, it is within the knowledge of those skilled in the relevant art(s) to affect such feature, structure, or characteristic in connection with other exemplary embodiments whether or not explicitly described.

The following Detailed Description of the exemplary embodiments reveals the general nature of the disclosure so that others can, by applying knowledge of those skilled in the relevant art(s), readily modify and/or adapt for various applications such exemplary embodiments, without undue experimentation, without departing from the spirit and scope of the disclosure. Therefore, such adaptations and modifications are intended to be within the meaning and plurality of equivalents of the exemplary embodiments based upon the teaching and guidance presented herein. It is to be understood that the phraseology or terminology herein is for the purpose of description and is to be interpreted by those skilled in relevant art(s) in light of the teachings herein.

The present disclosure presents a vehicle having a fuel system that overcomes the limitation of known systems and methods. The disclosed fuel system includes a vehicle fuel tank, a refueling connector, a connection detector, an in-tank fuel pickup, a fuel pump input selector, a vehicle fuel pump, a fill/run fuel selector, and a controller. The vehicle fuel tank includes a tank inlet port configured to receive fuel (i.e., LP gas) from a source tank, and a tank outlet port configured to supply fuel to an engine supply line of the vehicle. The refueling connector is coupled to the tank inlet port and is configured to connect to a refueling nozzle of the source tank. The connection detector is configured to detect connection of the refueling connector and the refueling nozzle. The in-tank fuel pickup is configured to receive fuel from the vehicle fuel tank. The fuel pump input selector includes a first inlet port configured for connection to the tank inlet port, a second inlet port coupled to the in-tank fuel pickup, and an outlet port. The fuel pump input selector is configured to selectively direct fuel to the outlet port from the first inlet port during a refuel mode or from the second inlet port during a run mode.

The vehicle fuel pump is coupled between the outlet port of the fuel pump input selector and the tank outlet port and is operable to pump fuel to the tank outlet port from one of the source tank or the in-tank fuel pickup. The fill/run fuel selector is configured to selectively direct fuel from a receiving port of the vehicle fuel tank to the tank fill port during the refuel mode or to the engine supply line during the run mode. The controller is configured to control the fuel pump input selector, the vehicle fuel pump, and the fill/run fuel selector based on a signal received from the connection detector such that the vehicle fuel tank is refueled without the use of an external refueling pump.

Figure 2A:
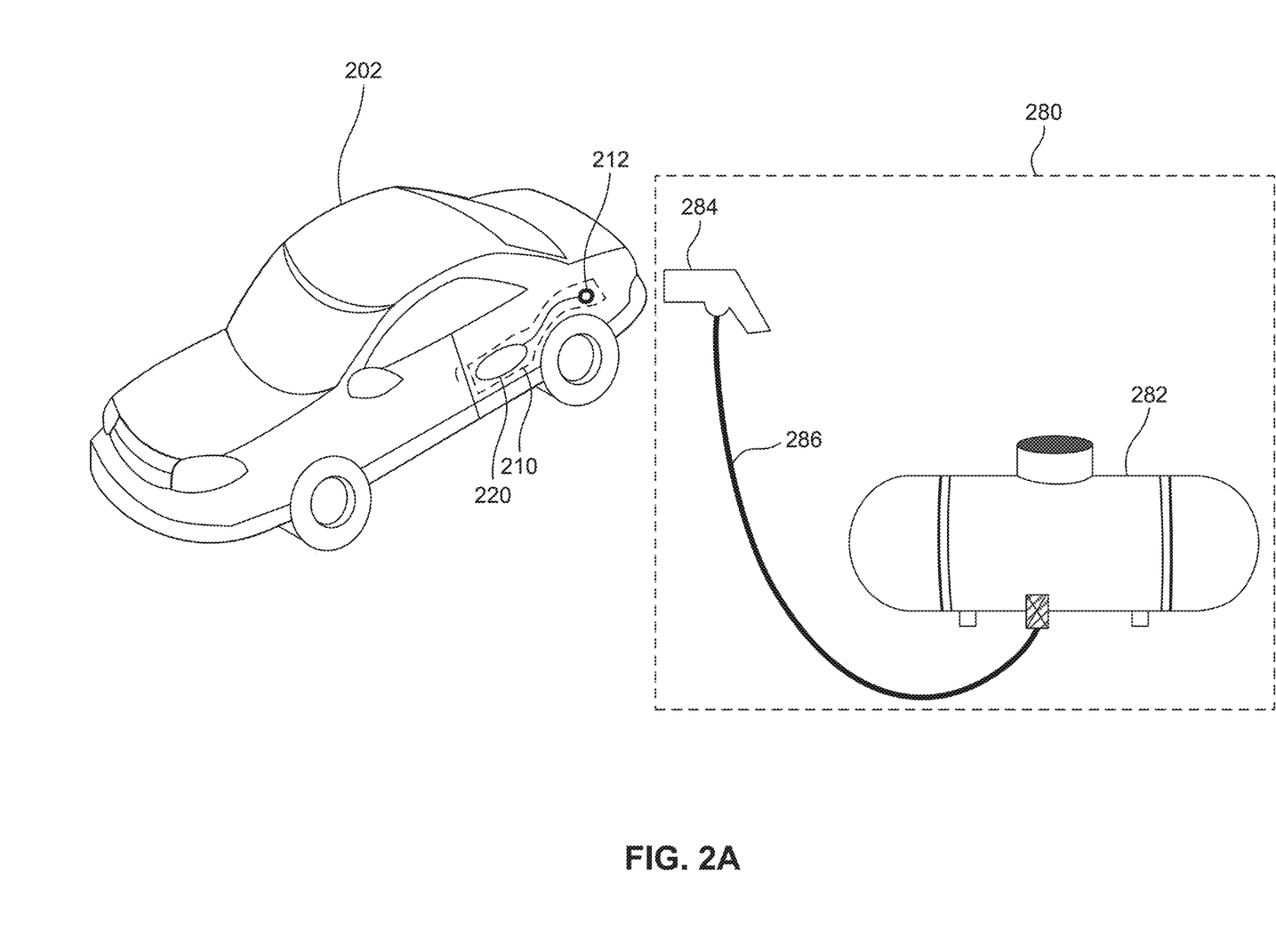
FIG. 2A illustrates a vehicle and an LPG refueling appliance, according to exemplary embodiments of the present disclosure.

FIG. 2A illustrates a vehicle 202 and an LP gas refueling appliance 280, according to exemplary embodiments of the present disclosure. As shown by FIG. 2A, and as described in more detail below, vehicle 202 and LP gas refueling appliance 280 are configured to refuel vehicle 202 without the use of an external refueling pump, such as refueling pump 156 required by vehicle 110 of FIGS. 1A-1B. Vehicle 202 includes a fuel system 210 having a vehicle fuel tank 220 that receives fuel from LP gas refueling appliance 280 by way of a vehicle connector 212. LP gas refueling appliance 280 includes a fuel storage tank 282 for storing fuel, a dispensing nozzle 284 for dispensing fuel to vehicle 202, and a hose 286 connected between fuel storage tank 282 and dispensing nozzle 284.

Fuel storage tank 282 can be any fuel storage tank manufactured of a material, such as steel, for storage or transfer of a fuel, such as LP gas. In an embodiment, fuel storage tank 282 is configured for use at a private residential home, a refueling station, an automotive service station (e.g., a "gas station"), or at a corporate site for fleet refueling management of fuel tanks with liquid withdrawal.

Dispensing nozzle 284 includes a refueling nozzle formed from a material(s) substantially resistant to degradation by contact with LP gas. Dispensing nozzle 284 includes a connector configured to connect to vehicle connector 212 and a trigger or lever (not shown) for opening a port for dispensing fuel received from fuel storage tank 282. In an embodiment, dispensing nozzle 284 is a quick connect nozzle, such as a GPV 14 nozzle manufactured by Staubli of Pfäffikon, Switzerland and available from http://www.staubli.com/en/connectors/quick-couplings/fuels/liquid-petroleum-gas/refueling-nozzle-lpg/.

Hose 286 is a conduit coupled between fuel storage tank 282 and dispensing nozzle 284. Hose 286 connects to a bottom portion of fuel storage tank 282 such that fuel is gravity filled into hose 286. Hose 286 is formed from a material(s) that is substantially resistant to degradation by contact with an LP gas, and has sufficient structural integrity to withstand the vapor pressures found in a vehicle propane tank (e.g., 300 psi). In an embodiment, hose 286 can be formed from metals such as copper, brass, or steel, or some polymers such as polyethylene or nitrile, or any combination of these materials. But flexibility is desired in at least portion of hose 286 for many applications, so rigid metal pipes would not be a desired embodiment for the entire hose 286. Examples of flexible hoses suitable for hose 286 include a synthetic rubber hose, such as an Aeroquip FC-321 LPG hose (available from Aeroquip Performance Products, http://aeroquipperformance.com, a subsidiary of Eaton Corporation PLC, Cleveland, Ohio) or a series 7132 LPG hose manufactured by Parker Hannifin Corporation, Parflex Division, Ravenna, Ohio, http://parker.com. In an exemplary embodiment, hose 286 (or portions thereof) are sufficiently flexible to facilitate making connections between dispensing nozzle 284 and vehicle connector 212 of vehicle 202.

Figure 2B:
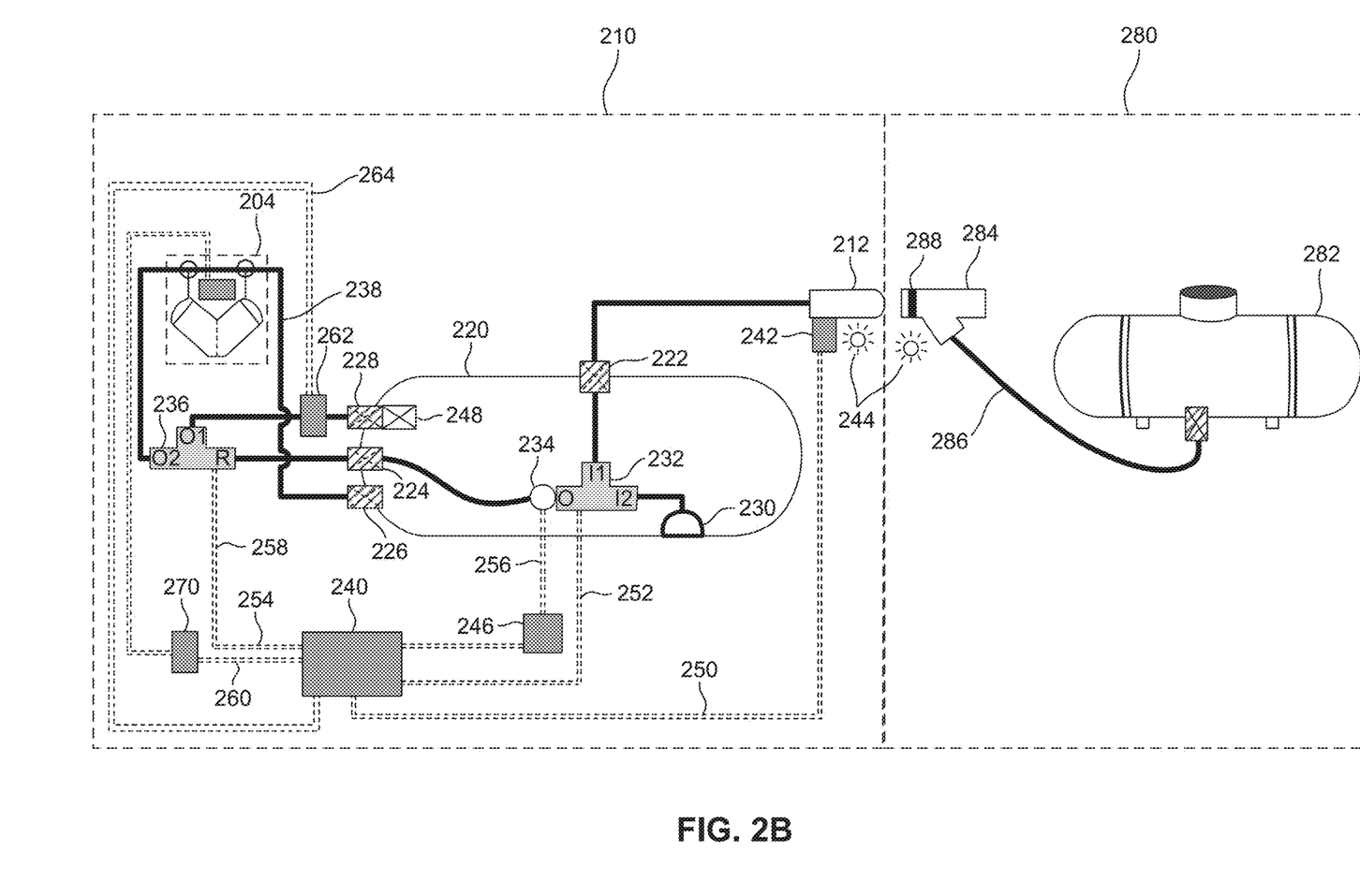
FIG. 2B is a schematic diagram illustrating the vehicle and the LPG refueling appliance of FIG. 2A, according to exemplary embodiments of the present disclosure.

FIG. 2B is a schematic diagram illustrating vehicle 202 and LP gas refueling appliance 280 of FIG. 2A, according to exemplary embodiments of the present disclosure. Vehicle fuel system 210 is configured to refuel vehicle fuel tank 220 and to provide fuel to an engine 204 of vehicle 202. Vehicle connector 212 is a refueling connector configured to couple to dispensing nozzle 284. In an embodiment, vehicle connector 212 is a quick connect connector such as a K-15 type connector, which is a standardized connection for LP gas vehicles. However, in an embodiment, vehicle connector 212 may be a threaded connector.

Use of vehicle connector 212 allows vehicle 202 to connect to conventional refueling systems, such as conventional refueling station 150 described above, and embodiments of the present disclosure during a refueling process.

Vehicle fuel tank 220 includes a tank inlet port 222 configured to receive fuel from vehicle connector 212, a tank outlet port 224 configured to supply fuel to engine 204 of vehicle 202, and a fuel return port 226 configured to receive unused fuel from engine 204 of vehicle 202. In an embodiment, vehicle fuel tank 220 includes a tank fill port 228 configured to dispense fuel into vehicle fuel tank 220 during refueling. Vehicle fuel tank 220 is manufactured of a material, such as steel, for storage or transfer of a fuel, such as LP gas.

Fuel system 210 includes an in-tank fuel pickup 230 configured to receive fuel from within fuel tank 220. In-tank fuel pickup 230 is a tube, a hose, or a port of a fuel pump input selector 232 formed from a material(s) that is substantially resistant to degradation by contact with an LP gas. In an embodiment, in-tank fuel pickup 230 includes a filter (not shown) configured to filter fuel.

Fuel system 210 includes fuel pump input selector 232 having a first inlet port I1 that connects to fuel inlet port 222, a second inlet port I2 that connects to in-tank fuel pickup 230, and an outlet port O. Fuel pump input selector 232 is configured to selectively direct fuel from one of the first inlet port I1 or the second inlet port I2 to the outlet port O. In other words, fuel pump input selector 232 selects to receive fuel from storage tank 282 via fuel inlet port 222 or vehicle fuel tank 220 via in-tank fuel pickup 230. Fuel pump input selector 232 directs fuel from the first inlet port I1 during a refuel mode, and from the second inlet port I2 during a run mode. In an embodiment, fuel pump input selector 232 is a three-port solenoid valve.

Fuel system 210 includes a fuel pump 234 which is coupled between the outlet port O of fuel pump input selector 232 and tank outlet port 224. Fuel pump 234 is operable to pump vapor and liquid fuel from one of storage tank 282 or in-tank fuel pickup 230. In an embodiment, fuel pump 234 is a variable speed direct current (DC) pump such as a turbine, membrane, or positive displacement pump. An example of a fuel pump 234 is fuel pump Part No. 080/410000/XX manufactured by Prins Autogassystemen BV of The Netherlands (www.prinsautogas.com). In an embodiment, fuel pump 234 is a ceramic pump to improve longevity of fuel pump 234. In further embodiments, fuel pump 234 is two or more fuel pumps in series and/or in parallel. The two or more fuel pumps are arranged to output a pump head and/or a flow rate as designed to support engine 204.

While fuel pump input selector 232 and fuel pump 234 are illustrated as being located within vehicle fuel tank 220, other arrangements of these components may be used, as would be understood by those skilled in the art. For example, one or more of fuel pump input selector 232 or fuel pump 234 may be located exterior to vehicle fuel tank 220.

Fuel system 210 includes a fill/run fuel selector 236 having a receiving port R coupled to tank outlet port 224, a first outlet port O1 coupled to tank fill port 228, and a second outlet port O2 coupled to an engine supply line 238 of vehicle 202. Fill/run fuel selector 236 is configured to selectively direct fuel from the receiving port R to one of the first outlet port O1 or the second outlet port O2. In other words, fill/run fuel selector 236 selectively directs fuel to one of tank fill port 228 or engine supply line 238. Fill/run fuel selector 236 directs fuel to the first outlet port O1 during a refuel mode, and to the second outlet port O2 during a run mode. In an embodiment, fill/run fuel selector 236 is a three-port solenoid valve.

While fill/run fuel selector 236 is illustrated as being located exterior to vehicle fuel tank 220, other arrangements of this component may be used, as would be understood by those skilled in the art. For example, fill/run fuel selector 236 may be located inside vehicle fuel tank 220.

Fuel system 210 includes a controller 240 configured to control fuel pump input selector 232, fuel pump 234, and fill/run fuel selector 236. Controller 240 is also electrically connected to a connection detector 242 via an electrical connection 250 and is configured to receive a connection indicator signal via electrical connection 250 from connection detector 242. The connection indicator signal indicates whether dispensing nozzle 284 is connected to or disconnected from vehicle connector 212. When dispensing nozzle 284 is connected to vehicle connector 212, engine 204 of vehicle 202 is precluded from starting or running.

In an embodiment, connection detector 242 is a normally open circuit which is closed when dispensing nozzle 284 is connected to vehicle connector 212. In an embodiment, dispensing nozzle 284 includes a connection mate 288. Connection mate 288 is a circuit, a wire, or a magnet that can be sensed or detected when in close proximity to connection detector 242. Connection detector 242 detects contact with connection mate 288 thereby detecting connection of dispensing nozzle 284. In another embodiment, connection detector 242 and connection mate 288 comprise a radio transmitter and receiver system such as a near field communication (NFC) system, a radio frequency identification (RFID) system, a Bluetooth® communication system, or another communication system configured to indicate connection of the dispensing nozzle 284 to the vehicle connector 212. In an embodiment, one or both of vehicle connector 212 and dispensing nozzle 284 includes a visual or audible connection indicator 244 configured to indicate connection of dispensing nozzle 284 to vehicle connector 212. For example, connection indicator 244 may include one or more of a light emitting diode (LED) or audio indicator such as a beeping noise to indicate connection between dispensing nozzle 284 and vehicle connector 212.

Controller 240 electrically connects to fuel pump input selector 232 via an electrical connection 252 and is configured to control fuel pump input selector 232. Controller 240 transmits an input selector signal via electrical connection 252 to fuel pump input selector 232 to control selection between the first inlet port I1 and the second inlet port I2. For example, when controller 240 receives a connection indicator signal via electrical connection 250 indicating that vehicle fuel system 210 is in a refuel mode, controller 240 transmits the input selector signal via electrical connection 252 to fuel pump input selector 232 to control the input of fuel such that fuel is received from the first inlet port I1 of fuel input selector 232.

Controller 240 electrically connects to a power relay 246 via an electrical connection 254 and is configured to control power to fuel pump 234 by way of power relay 246. In an embodiment, controller 240 transmits a pump power signal via electrical connection 254 to power relay 246 to control power to fuel pump 234. The pump power signal is configured to control power relay 246 to enable, disable, or vary a voltage or a current of fuel pump 234. Power relay 246 electrically connects to fuel pump 234 via an electrical connection 256 and provides power to fuel pump 234 based on the pump power signal received via electrical connection 254. For example, when controller 240 receives the connection indicator signal via electrical connection 250 indicating that vehicle fuel system 210 is in a refuel mode, controller 240 transmits a pump power signal via electrical connection 254 to power relay 246 to enable or decrease a voltage at fuel pump 234.

Controller 240 also electrically connects to fill/run selector 236 via an electrical connection 258 and is configured to control fill/run fuel selector 236. Controller 240 transmits an output selector signal via electrical connection 258 to fill/run selector 236 to control selection between the first outlet port O1 and the second outlet port O2. For example, when controller 240 receives the connection indicator signal via electrical connection 250 indicating that vehicle fuel system 210 is in a refuel mode, controller 240 transmits an output selector signal via electrical connection 258 to fill/run selector 236 to control the output fuel such that fuel is output from the first outlet port O1 to tank fill port 228.

In an embodiment, controller 240 is also configured to communicate with an electronic control unit (ECU) of fuel system 210 (not shown) to monitor a tank pressure of vehicle fuel tank 220, a fuel rail pressure of the fuel rails of engine 204, or any other output of the ECU of fuel system 210 and to control the performance of the fuel system 210 while connected to dispensing nozzle 284 and in refuel mode.

In an embodiment, controller 240 is also configured to control ignition lockout of engine 204 of vehicle 202 by enabling or disabling a user's ability to start or leave on an engine 204 of vehicle 202 during a refueling process. For example, when controller 240 receives the connection indicator signal via electrical connection 250 indicating that vehicle fuel system 210 is in a refuel mode, controller 240 transmits an ignition lockout signal via an electrical connection 260 to an ignition lockout system 270 which precludes engine 204 of vehicle 202 from starting or running. In an embodiment, ignition lockout system 270 includes an ignition coil shutoff that prevents spark plugs in engine 204 from receiving an ignition signal. In another embodiment, ignition lockout system includes a fuel injector shutoff that prevents fuel injectors of engine 204 from receiving an injector signal. In another embodiment, ignition lockout system 270 includes a starter signal interrupt that prevents a starter solenoid of vehicle 202 from receiving a starter signal from an ignition switch of vehicle 202. Either of these embodiments may include a relay controlled by controller 240 which opens a signal line within the ignition lockout system 270 to preclude ignition of engine 204.

In an embodiment, fuel system 210 includes an overfill protection device (OPD) 248 configured to prevent overfill of fuel in vehicle fuel tank 220. In an embodiment, OPD 248 is a float located near tank fill port 228 that rises as fuel fills vehicle fuel tank 220 and plugs tank fill port 228 when the fuel level has exceeded a particular fuel amount, typically 80% of vehicle fuel tank 220 level.

In an embodiment, fuel system 210 includes a flow switch 262 configured to monitor the flow of fuel to vehicle fuel tank 220 and to alert controller 240 with a flow cutoff signal when the flow of fuel decreases to or below a predetermined threshold (e.g., the rate of flow of the fuel is substantially zero gpm) due to the tank fill port 228 being plugged by OPD 248. Controller 240 electrically connects to flow switch 262 via an electrical connection 264 and is configured to receive the flow cutoff signal via electrical connection 262. When controller 240 receives the flow cutoff signal, controller 240 transmits a pump power signal via electrical connection 254 to power relay 246 to disable fuel pump 234 and therefore stop a refueling process.

Figure 2C:
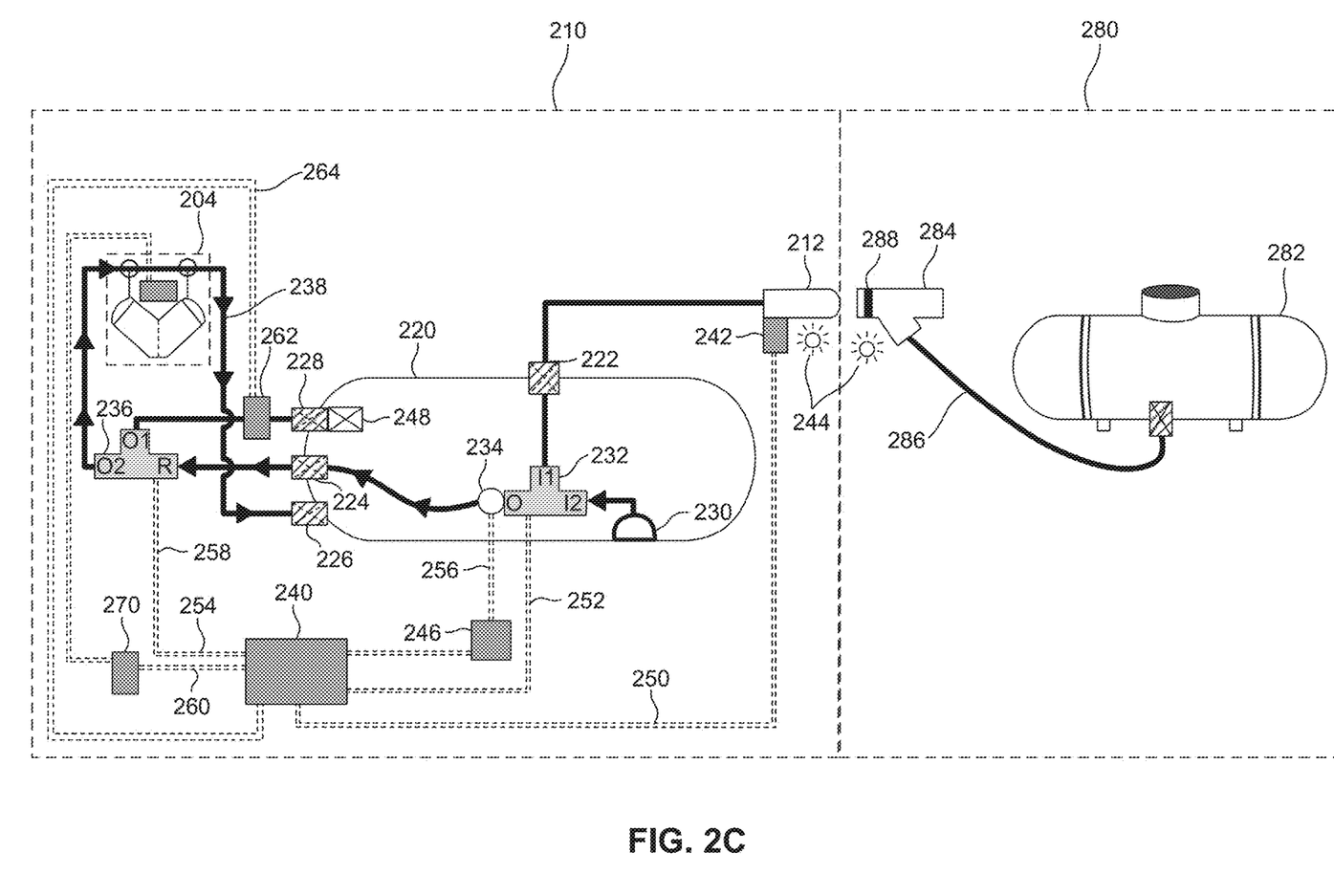
FIG. 2C is a schematic diagram illustrating the vehicle of FIG. 2A in a run mode, according to exemplary embodiments of the present disclosure.

FIG. 2C is a schematic diagram illustrating vehicle 202 of FIG. 2A in a run mode, according to exemplary embodiments of the present disclosure. In operation, the dispensing nozzle 284 is disconnected from vehicle connection 212 causing a connection indicator signal, indicating that dispensing nozzle 284 is disconnected, to be received by controller 240 from connection indicator 244 via electrical connection 250. This arrangement allows engine 204 to start and run. In run mode, controller 240 controls fuel input selector 232 to receive fuel from in-tank fuel pickup 230 via the second inlet port I2. Fuel pump input selector 232 switches inlet ports or retains the second inlet port I2 such that fuel can be received from the second inlet port I2. Controller 240 also transmits an output selector signal via electrical connection 258 to fill/run selector 236. In run mode, the output selector signal indicates to fill/run selector 236 to output fuel to engine supply line 238 via the second outlet port O2. Fill/run selector 236 then switches outlet ports or retains the second outlet port O2 such that fuel can be output through the second outlet port O2 to engine supply line 238. Controller 240 further transmits a pump power signal via electrical connection 254 to power relay 246 to enable power to fuel pump 234 such that fuel pump 234 pumps fuel from in-tank pickup 230 to engine 204 of vehicle 202, as shown by FIG. 2C.

Figure 2D:
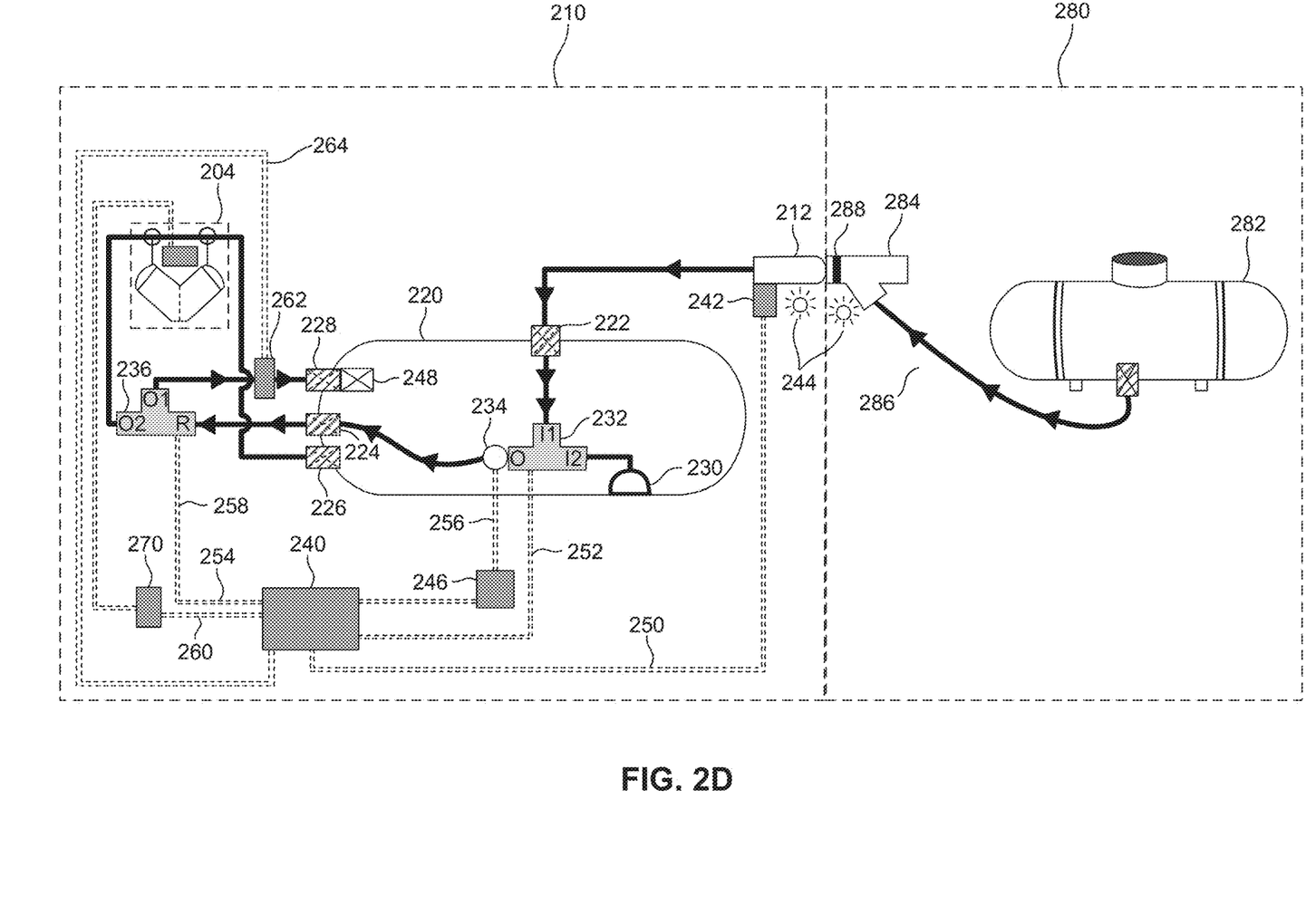
FIG. 2D is a schematic diagram illustrating the vehicle of FIG. 2A in a refuel mode, according to exemplary embodiments of the present disclosure.

FIG. 2D is a schematic diagram illustrating vehicle 202 of FIG. 2A in a refuel mode, according to exemplary embodiments of the present disclosure. In operation, a user connects dispensing nozzle 284 to vehicle connection 212 causing a connection indicator signal, indicating that dispensing nozzle 284 is connected, to be transmitted from connection indicator 244 to controller 240 via electrical connection 250. In refuel mode, controller 240 transmits an input selector signal via electrical connection 252 to fuel pump input selector 232. In refuel mode, the input selector signal indicates to fuel input selector 232 to receive fuel from storage tank 282 via the first inlet port I1. Fuel pump input selector 232 switches inlet ports or retains the first inlet port I1 such that fuel can be received from the first inlet port I1. Controller 240 also transmits an output selector signal via electrical connection 258 to fill/run selector 236. In refuel mode, the output selector signal indicates to fill/run selector 236 to output fuel to fill port 228 via the first outlet port O1. Fill/run selector 236 then switches outlet ports or retains the first outlet port O1 such that fuel can be output through the first outlet port O1 to vehicle fuel tank 220. Controller 240 further transmits a pump power signal via electrical connection 254 to power relay 246 to enable, increase, or decrease voltage to fuel pump 234 such that fuel pump 234 pumps fuel from storage tank 282 to vehicle fuel tank 220, as shown by FIG. 2D.

Vehicle fuel tank 220 receives fuel from storage tank 282 until a user disconnects dispensing nozzle 284 or an amount of fuel in vehicle fuel tank 220 reaches a predetermined amount. Once the predetermined amount is reached, OPD 248 plugs tank fill port 228 which, in turn, activates flow switch 262 to transmit the flow cut off signal to controller 240 via electrical connection 262. Controller 240 then transmits a pump power signal via electrical connection 254 to power relay 246 to disable fuel pump 234 and therefore stops the flow of fuel from the storage tank 282. When a user disconnects dispensing nozzle 284 from the vehicle connector 212, a connection indicator signal, indicating that that the dispensing nozzle 284 is disconnected, is transmitted from connection indicator 244 to controller 240 via electrical connection 250.

In an embodiment, controller 240 further transmits ignition lock signal via electrical connection 260 to ignition lockout system 270 such that engine 204 of vehicle 202 is unable to start or run while dispensing nozzle 284 is connected to vehicle connector 212, when in refuel mode. Further, when dispensing nozzle 284 is disconnected from vehicle connector 212, controller 240 transmits a signal to the ignition lockout system 270 to enable a user's ability to start engine 204.

In an embodiment, a default mode for vehicle 202 is the refuel mode. In this embodiment, fuel input selector 232 defaults to first inlet port I1, and fill/run selector 236 defaults to first outlet port O1 when engine 204 of vehicle 202 is turned off. By defaulting to this arrangement, vehicle 202 can be refueled by embodiments of the present disclosure and by conventional refueling systems, such as conventional refueling station 150 described above.

Converting a vehicle to include fuel system 210, in comparison with the conventional fuel system, such as fuel system 110 of FIG. 1A, allows a user to obtain significant savings and conveniences. For example, a user is able to convert a vehicle, such as vehicle 202, and a refueling station, such as LPG refueling appliance 280, without the use of an additional pump, such as refueling pump 156 of FIG. 1 and thereby save the expense of purchasing an external pump. Conventional refueling stations, such as conventional refueling station 150, may cost tens of thousands of dollars to be added to a property (e.g., $45,000), and each vehicle costs around $7,000 to convert to LP gas. In contrast, conversion of a vehicle to LP gas, such as vehicle 202, and conversion of storage tank 282 to include dispensing nozzle 284, in accordance with the present disclosure, is estimated to cost about $8,500.

Typically, refueling pump 156 has a significantly higher flow rate than fuel pump 234. For example, a typical refueling pump, such as refueling pump 156, may be a three horsepower, 230 volt turbine pump that pumps at a rate of 10-12 gallons per minute, while fuel pump 234 of the present disclosure may have a flow rate of 0.5-1 gallon per minute. The higher flow rate of refueling pump 156 allows a user to finish refueling at a conventional refueling station, such as conventional refueling station 150, within a short period of time, such as ten minutes. The lower volume capabilities of fuel pump 234 will require longer refueling times. However, a fuel system according to embodiments of the present disclosure, such as fuel system 210, provides additional conveniences not obtainable by conventional fuel systems, such as fuel system 110. For example, use of fuel pump 234 in combination with one or more of connection detector 242, OPD 248, and ignition lockout by fuel system 210 allows a user to leave vehicle 202 unattended during refuel mode. Thus, use of fuel system 210 and LP gas refueling appliance 280 during refueling allows a user to connect refuel nozzle 288 to vehicle connection 212 and leave vehicle 202 unattended for a long period of time, for example, while the user is at home asleep, without worrying about overfill of vehicle fuel tank 220.

Fuel pump 234 can also be configured to pump fuel from storage tank 282 at a significantly lower flow rate during the refuel mode as compared to the flow rate that fuel is pumped during the run mode. During run mode, fuel rails of engine 204 require fuel pump 234 to retain a constant high pressure to retain LP gas in a liquid form to counteract heat caused by engine 204. Thus, fuel pump 234 is selected to have a rotations per minute (RPM) rating that can retain the constant high pressure required during run mode. For example, in a run mode, controller 240 can be configured to control the rotations per minute (RPM) of fuel pump 234 at a first speed via power relay 246 using a 12 volt power signal. However, in refuel mode, engine 204 is not creating heat and therefore less pressure is required to retain the LP gas in liquid form. Accordingly, controller 240 can control the RPM of fuel pump 234 at a second speed (e.g., at a speed lower than the first speed) using a lower voltage, such as a 6 volt power signal via power relay 246. By decreasing the voltage, the life of fuel pump 234 may be extended in comparison to powering fuel pump 234 at the higher voltage during both run mode and refueling mode.

In an embodiment, controller 240 is also configured to reverse the polarity to fuel pump 234 at any voltage output. By reversing the polarity on fuel pump 234, controller 240 can adjust pressure in vehicle fuel tank 220 to be closer to or equal to pressure in fuel storage tank 282, if needed. For example, prior to a refueling process, controller 240 may reverse the polarity of fuel pump 234 to reduce the pressure in vehicle fuel tank 220 if the pressure level of the fuel storage tank 282 (e.g., 100 psi) is less than the pressure level of vehicle fuel tank 220 (e.g., 300 psi). By reducing the pressure in vehicle fuel tank 220, fuel pump 234 is able to more easily pump fuel from fuel storage tank 282 to vehicle fuel tank 220.

Figure 3:
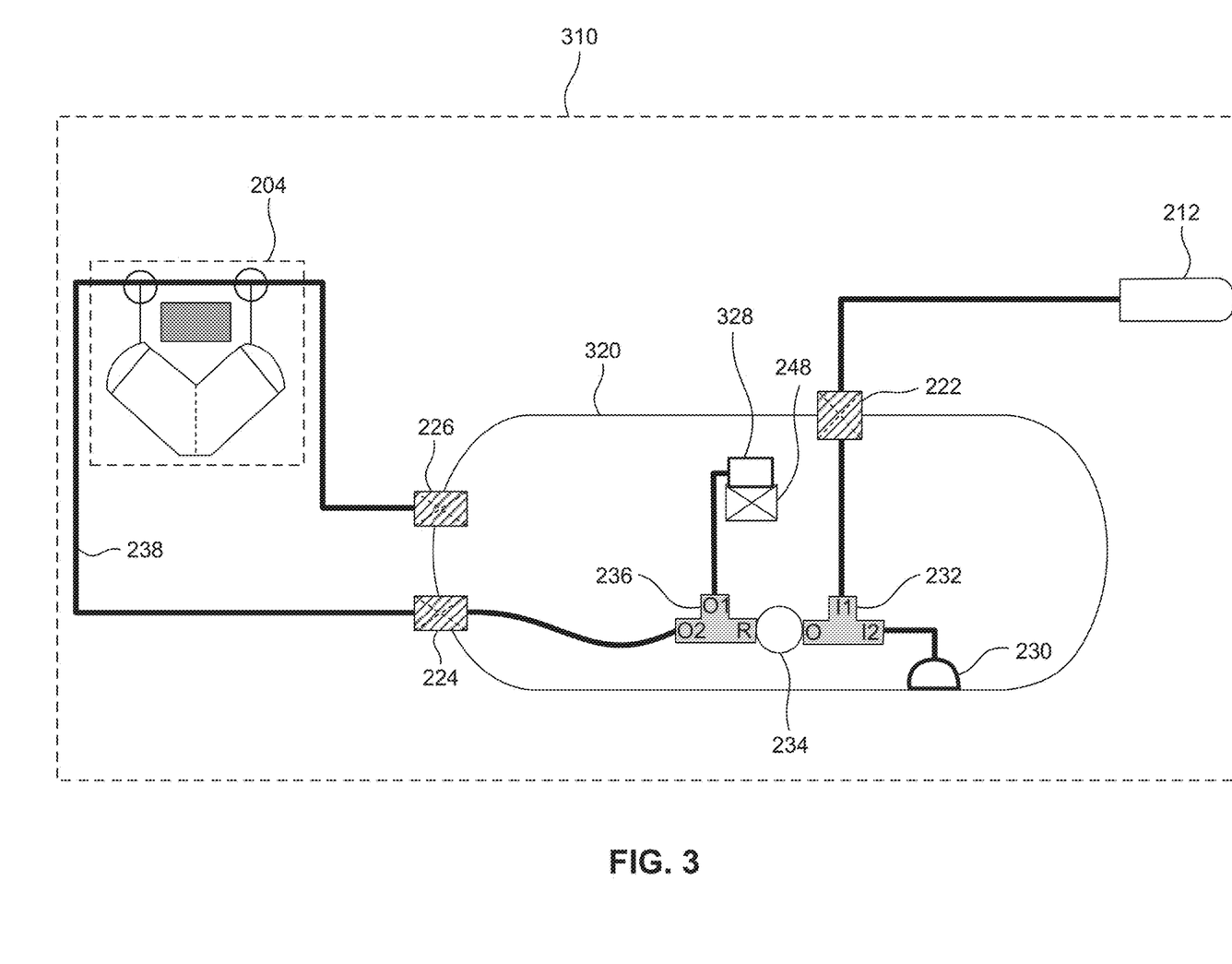
FIG. 3 is a schematic diagram illustrating a vehicle, according to another exemplary embodiment of the present disclosure.
Figure 4:
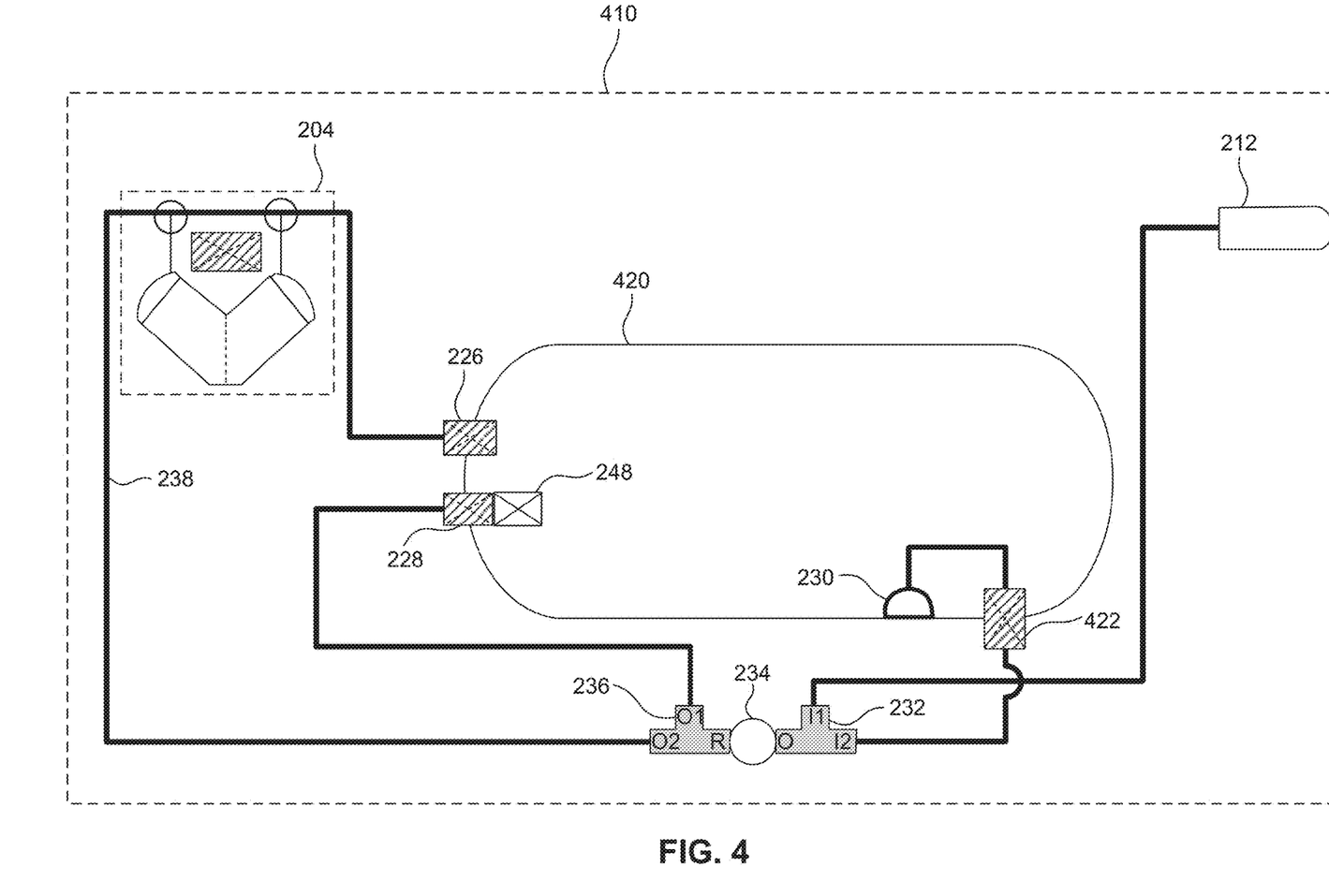
FIG. 4 is a schematic diagram illustrating a vehicle, according to yet another exemplary embodiment of the present disclosure.

FIGS. 3-4 are schematic diagrams illustrating vehicle fuel systems of vehicles, according to exemplary embodiments of the present disclosure. Because control of the vehicle fuel systems illustrated in FIGS. 3-4 are the same as discussed above, illustration and discussion on the controller 240, and corresponding electrical connections, is avoided for brevity.

FIG. 3 is a schematic diagram illustrating a vehicle fuel system 310 of a vehicle, according to exemplary embodiments of the present disclosure. As illustrated, by FIG. 3, vehicle fuel system 310 includes vehicle fuel tank 320, where fill/run fuel selector 236 is located within vehicle fuel tank 320. In this arrangement, fuel pump 234 is coupled to the receiving port R of fill/run fuel selector 236 such that the first outlet port O1 of fill/run fuel selector 236 outputs fuel directly into vehicle fuel tank 320 by way of port 328, which may be a port (e.g., first outlet port O1) on fill/run fuel selector 236 or a hose. Based on the arrangement of fill/run fuel selector 236, according to FIG. 3, the need for tank fill port 228 is avoided, as compared to other embodiments of this disclosure.

FIG. 4 is a schematic diagram illustrating a vehicle fuel system 410 of a vehicle, according to exemplary embodiments of the present disclosure. As illustrated, by FIG. 4, vehicle fuel system 410 includes vehicle fuel tank 420, where fuel pump input selector 232 and fuel pump 234 are located exterior to vehicle fuel tank 420. In this arrangement, vehicle fuel tank 420 includes pickup port 422, where first inlet port I1 of fuel pump input selector 232 is coupled to vehicle connector 212, pickup port 422 of vehicle fuel tank 220 is coupled to second inlet port I2 of fuel pump input selector 232 and to fuel pickup 230, and receiving port R of fill/run fuel selector 236 is coupled to the output of the fuel pump 236. Based on this arrangement of fuel pump input selector 232 and fuel pump 234, need for tank outlet port 224 is avoided, as compared to other embodiments of this disclosure.

CONCLUSION

It is to be appreciated that the Detailed Description section, and not the Abstract section, is intended to be used to interpret the claims. The Abstract section may set forth one or more, but not all exemplary embodiments, and thus, is not intended to limit the disclosure and the appended claims in any way.

The disclosure has been described above with the aid of functional building blocks illustrating the implementation of specified functions and relationships thereof. The boundaries of these functional building blocks have been arbitrarily defined herein for the convenience of the description. Alternate boundaries may be defined so long as the specified functions and relationships thereof are appropriately performed.

It will be apparent to those skilled in the relevant art(s) that various changes in form and detail can be made therein without departing from the spirit and scope of the disclosure. Thus, the disclosure should not be limited by any of the above-described exemplary embodiments, but should be defined only in accordance with the following claims and their equivalents.

What is claimed is:

1. A fuel system for a vehicle, the fuel system comprising:
a vehicle fuel tank comprising:
a tank inlet port configured to receive fuel from a source tank, and
a tank outlet port configured to supply fuel to an engine supply line of the vehicle;
an in-tank fuel pickup configured to receive fuel from the vehicle fuel tank; and
a fuel pump input selector including a first inlet port configured for connection to the tank inlet port, a second inlet port coupled to the in-tank fuel pickup, and an outlet port, the fuel pump input selector configured to selectively direct fuel to the outlet port from the first inlet port during a refuel mode or from the second inlet port during a run mode.

2. The fuel system of claim 1, further comprising a controller configured to control selection by the fuel pump input selector between the first inlet port and the second inlet port.

3. The system of claim 2, further comprising:
a refueling connector coupled to the tank inlet port and configured to connect to a refueling nozzle of the source tank; and
a connection detector configured to detect connection of the refueling connector and the refueling nozzle.

4. The fuel system of claim 3, wherein the controller is further configured to prevent operation of the vehicle when the connection detector detects connection to the refueling nozzle.

5. The fuel system of claim 4, further comprising an ignition lockout module responsive to the controller to prevent operation of the vehicle by disabling an ignition of an engine of the vehicle.

6. The fuel system of claim 3, wherein the controller is configured to switch the fuel pump input selector to the refueling mode when the connection detector detects connection to the refueling nozzle.

7. The fuel system of claim 3, wherein the vehicle fuel tank further comprises a tank fill port and the fuel system further comprises a fill/run fuel selector including a receiving port coupled to the tank outlet port, a first outlet port coupled to the tank fill port, and a second outlet port coupled to the engine supply line of the vehicle, the fill/run fuel selector configured to selectively direct fuel from the receiving port to the tank fill port during the refueling mode or to the engine supply line during the run mode.

8. The fuel system of claim 7, wherein the controller is further configured to control selection by the fill/run fuel selector between the first outlet port and the second outlet port.

9. The fuel system of claim 8, further comprising a flow switch configured to detect a flow of fuel into the vehicle fuel tank and to indicate to the controller when the flow of fuel decreases below a predetermined threshold.

10. The fuel system of claim 3, wherein the connection detector comprises one of a magnetic detector or a radio frequency detector.

11. A refueling system, comprising:
a refueling appliance, the refueling appliance comprising:
a storage tank configured to store fuel, and
a refueling nozzle coupled to the storage tank and configured to couple to a refueling connector to dispense fuel from the source tank to a fuel tank of a fuel system, wherein the fuel system comprises a fuel pump input selector including a first inlet port configured to receive fuel from the refueling connector, a second inlet port configured to receive fuel from the fuel tank, and an outlet port,
wherein the fuel pump input selector is configured to selectively direct fuel to the outlet port from the first inlet port during a refuel mode or from the second inlet port during a run mode.

12. The refueling system of claim 11, further comprising a controller configured to control selection by the fuel pump input selector between the first inlet port and the second inlet port.

13. The refueling system of claim 12, wherein the controller is configured to adjust the pressure of the fuel tank so that the pressure of the fuel tank is substantially equal to the pressure of storage tank.

14. The refueling system of claim 11, further comprising a fuel pump disposed in the fuel tank, and a controller configured to transmit a power signal to the fuel pump, and
wherein the controller is configured to reverse the polarity of the power signal transmitted to the fuel pump to adjust the pressure of the fuel tank.

15. The refueling system of claim 12, further comprising a connection detector configured to detect connection between the refueling connector and the refueling nozzle, and
wherein the controller is configured to switch the fuel pump input selector to the refuel mode when the connection detector detects connection between the refueling connector and the refueling nozzle.

16. The refueling system of claim 11, wherein the refueling nozzle includes a connection indicator configured to indicate visually or audibly a connection between the refueling nozzle and the refueling connector.

17. A fuel system for a vehicle, the fuel system comprising:

a vehicle fuel tank configured to store fuel, the vehicle fuel tank comprising:
- a tank inlet port configured to receive fuel from a source tank,
- a tank outlet port configured to supply fuel to an engine supply line of the vehicle, and
- a tank fill port configured to receive fuel from the engine supply line of the vehicle;

a fill/run fuel selector having a receiving port coupled to the tank outlet port, a first outlet port coupled to the tank fill port, and a second outlet port coupled to the engine supply line of the vehicle, wherein the fill/run fuel selector is configured to selectively direct fuel from the receiving port to the tank fill port during a refueling mode or to the engine supply line during a run mode.

18. The fuel system of claim 17, further comprising a controller configured to control selection by the fill/run fuel selector between the first outlet port and the second outlet port.

19. The fuel system of claim 18, wherein the controller is configured to actuate the fill/run selector to direct fuel from the receiving port to the tank fill port when an engine of the vehicle is turned off.

20. The fuel system of claim 17, further comprising an overfill protection device configured to close the tank fill port when the volume of fuel stored in vehicle fuel tank reaches a predetermined amount.

* * * * *